United States Patent [19]

Kool et al.

[11] 4,405,373

[45] Sep. 20, 1983

[54] METHOD OF ALTERING THE EFFECTIVE BULK DENSITY OF SOLID MATERIAL AND THE RESULTING PRODUCT

[75] Inventors: Lawrence B. Kool; Robert L. Nolen; David E. Solomon, all of Ann Arbor, Mich.

[73] Assignee: The United States of America as represented by the U.S. Department of Energy, Washington, D.C.

[21] Appl. No.: 106,132

[22] Filed: Dec. 21, 1979

[51] Int. Cl.³ .......................... C08L 1/08; C08J 3/04
[52] U.S. Cl. ................................. 106/198; 106/122; 106/193 R; 264/13; 264/DIG. 6; 521/63; 521/64; 521/56
[58] Field of Search ............... 521/56, 78, 63, 64; 106/122, 193, 198

[56] References Cited

U.S. PATENT DOCUMENTS

| | | | |
|---|---|---|---|
| 2,797,201 | 6/1957 | Veatch et al. | 521/56 |
| 3,371,053 | 2/1968 | Raskin | 521/56 |
| 3,615,972 | 10/1971 | Morehouse, Jr. | 521/56 |
| 3,639,306 | 2/1972 | Sternberg et al. | 521/56 |
| 3,669,899 | 6/1972 | Vassiliades et al. | 521/56 |
| 3,779,957 | 12/1973 | Vassiliades et al. | 521/56 |
| 3,816,169 | 6/1974 | Vassiliades et al. | 521/56 |
| 3,821,128 | 6/1974 | Garner | 521/56 |
| 4,127,622 | 11/1978 | Watanabe et al. | 264/13 |

*Primary Examiner*—Morton Foelak
*Attorney, Agent, or Firm*—John A. Koch; Richard G. Besha

[57] ABSTRACT

A method of adjustably tailoring the effective bulk density of a solid material in which a mixture comprising the solid material, a film-forming polymer and a volatile solvent are sprayed into a drying chamber such that the solvent evaporates and the polymer dries into hollow shells having the solid material captured within the shell walls. Shell density may be varied as a function of solid/polymer concentration, droplet size and drying temperature.

5 Claims, 1 Drawing Figure

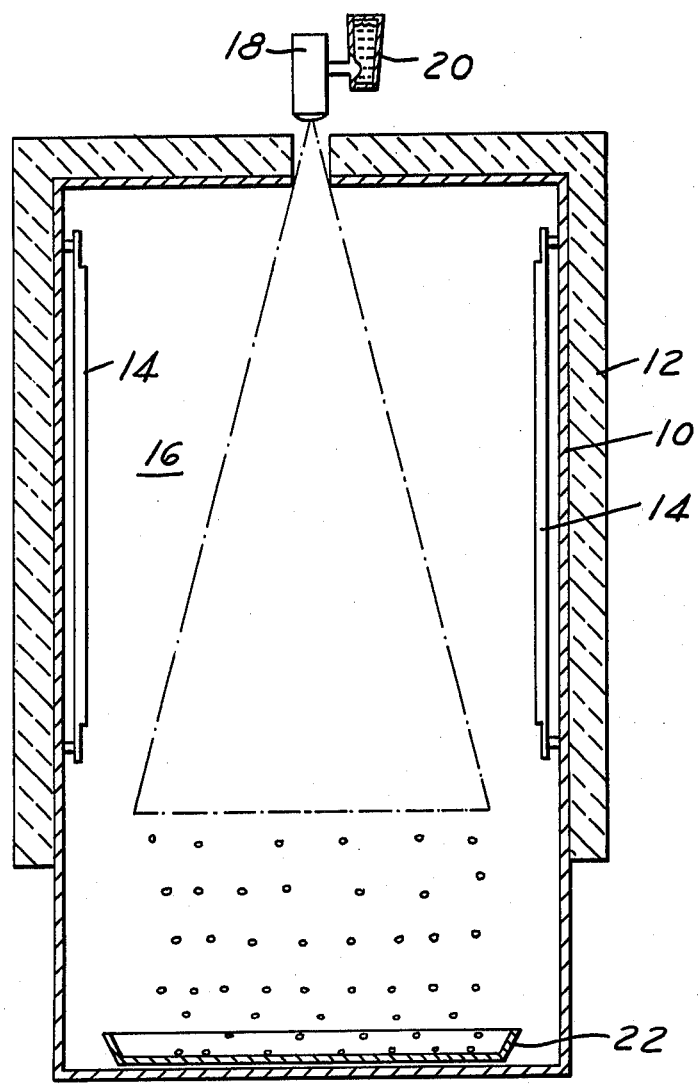

METHOD OF ALTERING THE EFFECTIVE BULK DENSITY OF SOLID MATERIAL AND THE RESULTING PRODUCT

BACKGROUND OF THE INVENTION

The invention relates to material processes, and more particularly to methods for altering or tailoring the bulk density of solid material and to the resulting product.

It is often desirable to suspend solid materials in a liquid medium having a bulk density which is substantially lower than that of the solid. For example, it is known that the conductivity of the plasma in magnetohydrodynamic power generators is improved substantially if a material such as cesium or a cesium compound is injected into the plasma. However, difficulties are encountered in attempts to suspend cesium carbonate having a bulk density of 4.6 grams per cubic centimeter (g/cc) in toluene, the plasma fuel, having a density of 0.866 g/cc. The cesium or cesium compound settles from suspension and clogs fuel passages.

An object of the present invention is to provide a method of altering or tailoring the effective density of a solid material such as cesium or a cesium compound so as to be readily suspendable in a medium of lesser density such as toluene. A related object of the invention is to provide a particulate product which includes said solid material and which possesses a bulk density which is tailored as desired.

BRIEF DESCRIPTION OF THE DRAWING

The drawing, which is not to scale, illustrates one presently preferred embodiment of an apparatus for practicing the invention.

DESCRIPTION OF THE PREFERRED EMBODIMENTS

It has been known heretofore that hollow spherical shells or particles may be formed by dissolving a film-forming polymer in a suitable volatile solvent and then spraying the mixture into the upper portion of a heated chamber to form atomized droplets. As the droplets fall by gravity within the heated chamber, the solvent rapidly evaporates and a polymeric skin or shell is formed. The U.S. patent to Veatch et al. U.S. Pat. No. 2,797,201 discloses such a process and an apparatus for practicing such process. The Veatch et al patent additionally teaches how polymer/solvent concentration, drying temperature and droplet size may be varied to yield shells of predetermined (nominal) size and density.

The drawing illustrates a modified chamber utilized in practice of the invention as comprising a four-foot square hollow rectangular chamber 10 of galvanized steel. Chamber 10 is preferably twelve feet high, such height being sufficient to permit particle solidification over a size range of interest. Chamber 10 is insulated externally by four inches of fiberglass 12 and has a plurality of sixteen five-foot long electrical resistance heaters 14 distributed at regular intervals around the inner chamber wall to provide uniform heating of the enclosed zone 16. An atomization nozzle 18 is disposed to feed droplets into an upper portion of zone 16 and preferably consists of a model A-CUADF Automatic Airbrush manufactured by Paasche Airbrush Company of 1809 Diversey Parkway, Chicago, Ill. 60614. This atomizer employs a high velocity jet of gas, preferably air, to impart a shearing force to solution received from a reservoir 20 to form droplets as the solution expands through the atomization orifice.

In accordance with the present invention, the method disclosed in the Veatch et al patent is modified and utilized to tailor the bulk density of desired solid materials by forming hollow spherical shells of polymeric material having the solid material captured within the shell walls. The size and weight of the ultimate shell may be tailored by varying polymer/solid/solvent concentration, droplet size and drying temperature.

The method of the invention is carried out by first forming a mixture comprising, and preferably consisting essentially of, the desired solid material, a film-forming polymer and a suitable volatile solvent in which the polymer is soluble. The solid material, which may be in elemental or compound form, may be reduced to powdered form having a particle size in the range of 5 $\mu$m to 0.1 $\mu$m, preferably 0.5 $\mu$m. Droplet size and shell wall thickness place an upper limit on particle size of the solid material.

A wide variety of film-forming polymers are identified in the above-referenced Veatch et al. patent. Polymers preferred in accordance with the present invention are selected from the group consisting of poly(vinyl alcohol), poly(methyl methacrylate), sodium carboxymethyl cellulose, poly(vinyl alcohol-co-vinyl butyral), polystyrene, polystyrene-co-allyl alcohol, poly(vinyl formal), poly(2-hydroxypropyl methacrylate) and ABS. Any solvent in which the selected polymer is soluble and which will evaporate at the desired chamber temperature would be suitable. The solvent essentially acts only as a polymer/solid carrier and plays no substantial role in the structure of the ultimate product. The mixture or solution in reservoir 20 is formed to possess a preselected solid/polymer concentration and a viscosity in the range of 1 to 500 cp. The solid material may be either soluble or suspendable in the polymer, solution or suspension being facilitated by an ultrasonic bath where desired.

The solid/polymer/solvent mixture is then sprayed as small atomized droplets of preselected (nominal) size into chamber 10 which is preheated to a predetermined temperature. The droplets may be anywhere from 5 $\mu$m to 500 $\mu$m in size, with a diameter in the range of 20 $\mu$m to 200 $\mu$m being preferred. Drying temperature may be in the range of 20° C. to 500° C., with the range of 50° C. to 200° C. being preferred. The relationship of mixture concentration, droplet size and drying temperature to ultimate shell density will be set forth hereinafter. The droplets are heated as they fall and the solvent vaporizes to form hollow shells having the suspended or soluble solid material captured in the shell walls. The chamber preferably encloses heated air at atmospheric pressure. The product shells, which may be collected in a tray 22 on the chamber floor, enclose air and solvent at a pressure at or slightly above atmospheric depending upon variations in shell permeability with temperature. The contained solvent will be liquid or vapor (or solid) depending upon shell temperature and resultant pressure.

The density of the product shells are primarily affected by adjustment of shell diameter and wall thickness, and of polymer/solid concentration. Shell density d is given by the equation $$d = pd_s(D_2/D_1)^3$$

where p equals weight fraction of polymer in the polymer/solid mixture, $d_s$ is the polymer/solid density, $D_1$ is shell diameter and $D_2$ is droplet diameter. The relationship of shell diameter and wall thickness to drying temperature, droplet size and concentration, may be determined empirically. Generally speaking, smaller droplets produce smaller shells, higher concentrations produce shells with thicker walls, and higher temperatures produce larger shells having thinner walls.

In a specific working example of the invention mentioned in the background above, it is desired to produce shells which include cesium and which may be suspended in toluene. Cesium carbonate and polyvinyl alcohol are materials of choice as the solid and polymer respectively. Water may be used as a solvent. An ultimate shell composition by weight of 50% cesium carbonate and 50% polyvinyl alcohol is selected arbitrarily. Calcium carbonate possesses a density of 4.6 g/cc and polyvinyl alcohol a density of 1.3 g/ccm. A desired shell radius of 10 μm is selected, which translates into a total shell volume $V_s$ of $4.19\times10^3$ μ$m^3$. Solution density $d_s$ is 2.95 g/cc, while that of toluene is 0.866 g/cc. Thus, an effective density reduction factor f of 3.4 is required. Shell wall volume $V_w$ is given by the equation $$V_w = V_s/f = 1.23\times10^3\ \mu m^3.$$

This implies a wall thickness of 1.09 μm.

A solution of 2.5% polyvinyl alcohol and 2.5% cesium carbonate in water was prepared and atomized in drying chamber 10. Mean atomized droplet size was 65 μm and chamber temperature was 150° C. The product shells had a radius of 10 to 50 μm and a wall thickness on the order of 1 μm. The shells could be suspended for several minutes in toluene with only slight agitation. The composition of the shells were 50% (by weight) poly(vinyl alcohol) and 50% cesium carbonate.

What is claimed is:

1. A method of suspending a solid material having a predetermined first bulk density in a carrier fluid having a second bulk density substantially less than said first bulk density comprising the steps of:

(a) forming a solution at preselected concentration comprising said solid material in powdered form, a film-forming polymer and a solvent in which said polymer is soluble, (b) forming said solution into droplets of predetermined nominal size, (c) forming said droplets into hollow spherical shells having a bulk density which is substantially equal to said second bulk density by spraying said solution in droplet form into the upper portion of a zone heated at atmospheric pressure to a preselected temperature such that said solvent evaporates as said droplets fall by gravity through said zone and said film-forming polymer forms said hollow spherical shells each having a shell wall in which said solid material is captured and having a said shell bulk density which is a function of said preselected concentration, said predetermined nominal droplet size and said preselected temperature, and then (d) suspending said spherical shells with said solid material captured in said shell walls in said carrier fluid.

2. The method set forth in claim 1 wherein said solution is formed to possess a viscosity in the range of 1 to 500 cp.

3. The method as set forth in claim 1 wherein said predetermined nominal droplet size is in the range of five to five hundred microns, and said preselected temperature is in the range of twenty to five hundred degrees centigrade.

4. The method as set forth in claim 3 wherein said predetermined nominal droplet size is in the range of twenty to two hundred microns, and said preselected temperature is in the range of fifty to five hundred degrees centigrade.

5. The method set forth in claim 2 or 4 wherein said polymer is selected from the group consisting of poly(vinyl alcohol), poly(methyl methacrylate), sodium carboxymethyl cellulose, poly(vinyl alcohol-co-vinyl butyral), polystyrene, polystyrene-co-allyl alcohol, poly(vinyl formal), poly(2-hydroxypropyl methacrylate) and ABS.

* * * * *